United States Patent
Killian et al.

(10) Patent No.: US 6,174,976 B1
(45) Date of Patent: Jan. 16, 2001

(54) NEUTRAL NICKEL COMPLEXES FOR OLEFIN POLYMERIZATION

(75) Inventors: Christopher Moore Killian, Gray; James Allen Ponasik, Jr., Kingsport, both of TN (US); Jason Patrick McDevitt, Wake Forest, NC (US); Peter Borden Mackenzie, Kingsport, TN (US)

(73) Assignee: Eastman Chemical Company, Kingsport, TN (US)

( * ) Notice: Under 35 U.S.C. 154(b), the term of this patent shall be extended for 0 days.

(21) Appl. No.: 09/030,059

(22) Filed: Feb. 24, 1998

Related U.S. Application Data

(60) Provisional application No. 60/039,965, filed on Mar. 6, 1997.

(51) Int. Cl.$^7$ ...................................................... C08F 4/26
(52) U.S. Cl. ............................ 526/172; 526/352; 526/126; 502/155
(58) Field of Search ................................... 526/172, 352

(56) References Cited

U.S. PATENT DOCUMENTS

| | | |
|---|---|---|
| 4,689,437 | 8/1987 | Murray . |
| 4,716,138 | 12/1987 | Murray . |
| 4,716,205 | 12/1987 | Klabunde . |
| 4,724,273 | 2/1988 | Fink et al. . |
| 4,906,754 | 3/1990 | Klabunde . |
| 5,030,606 | 7/1991 | Klabunde . |
| 5,175,326 | 12/1992 | Klabunde . |
| 5,705,503 | 1/1998 | Goodall et al. . |
| 5,714,556 * | 2/1998 | Johnson et al. ....................... 526/135 |
| 5,741,869 | 4/1998 | Goodall et al. . |
| 5,852,145 * | 12/1998 | McLain et al. ....................... 526/133 |
| 5,866,663 * | 2/1999 | Johnson et al. ....................... 526/170 |
| 5,880,241 * | 3/1999 | Brookhart et al. ................... 526/348 |
| 5,880,323 * | 3/1999 | Brookhart et al. ................... 585/527 |

FOREIGN PATENT DOCUMENTS

| | | |
|---|---|---|
| 381495 | 2/1990 | (EP) . |
| 96-70332 | 3/1996 | (JP) . |
| 96-84343 | 4/1996 | (JP) . |
| 96-84344 | 4/1996 | (JP) . |
| 96/23010 | 9/1996 | (WO) . |
| 9637522 | 11/1996 | (WO) . |
| 9637523 | 11/1996 | (WO) . |
| 97/02298 | 1/1997 | (WO) . |
| 9738024 | 10/1997 | (WO) . |
| 98-03521 | 1/1998 | (WO) . |
| 98/03559 | 1/1998 | (WO) . |
| 98/27124 | 6/1998 | (WO) . |
| 98/30609 | 7/1998 | (WO) . |
| 98/30610 | 7/1998 | (WO) . |
| 98/30612 | 7/1998 | (WO) . |
| 9830610 | 7/1998 | (WO) . |
| WO 9856832 * | 7/1998 | (WO) ................................ 526/170 |
| 9842664 | 10/1998 | (WO) . |
| 9842665 | 10/1998 | (WO) . |
| 9847934 | 10/1998 | (WO) . |
| 9856832 | 12/1998 | (WO) . |
| 9856837 | 12/1998 | (WO) . |
| 9856839 | 12/1998 | (WO) . |
| 9902472 | 1/1999 | (WO) . |
| 9905189 | 2/1999 | (WO) . |
| 9909078 | 2/1999 | (WO) . |

OTHER PUBLICATIONS

Desjardins, et al., Single componet N–O chelated arylnickel (ll) complexes as ethen polymerisation and CO/ethene copolymerisation catalysts. Journal of Organometallic Chem. , 544, 1997, 163–174.*
L. K. Johnson et al, J. Am. Chem. Soc., 1995, 117, 6414.
G. F. Schmidt et al, J. Am. Chem. Soc., 1985, 107, 1443.
M. Brookhart et al, Macromolecules, 1995, 28, 5378.
M. Peuckert et al, Organomet., 1983, 2(5), 594.
W. Keim et al., Angew, Chem. Int. Ed. Eng., 1981, 20, 116.
V. M. Mohring, et al, Angew. Chem. Int. Ed. Eng., 1985, 24, 1001.
G. Wilke, Angew, Chem. Int. Ed. Engl., 1988, 27, 185.
K.A.O. Starzewski et al, Angew, Chem. Int. Ed. Engl., 1987, 26, 63.
Tempel, et al., Organometallics, 1998, 17, 2290–2296.
Desjardins, et al, J. of Organometallics Chem., 554, 1997, 163–174.
Killian, et al, J. Am. Chem. Soc., 1996, 118, 11664–11665.
Mecking, et al., J. Am. Chem. Soc., 1998, 120, 888–899.

* cited by examiner

*Primary Examiner*—David W. Wu
*Assistant Examiner*—R. Harlan
(74) *Attorney, Agent, or Firm*—Jonathan D. Wood; Bernard J. Graves, Jr.; Harry J. Gwinnell

(57) ABSTRACT

Provided are novel olefin polymerization catalysts based on neutral nickel complexes of bidentate ligands containing a nitrogen atom and an oxygen atom and a process for the preparation of polyolefins using such catalysts. Preferred ligands possess imine and carboxylate groups.

34 Claims, No Drawings

NEUTRAL NICKEL COMPLEXES FOR OLEFIN POLYMERIZATION

CROSS REFERENCES TO RELATED APPLICATIONS

This Application claims the benefit under 35 U.S.C. §119(e) of Provisional Application Serial No. 60/039,965, filed Mar. 6, 1997.

FIELD OF THE INVENTION

This invention belongs to the field of olefin polymerization. More particularly, this invention provides a class of olefin polymerization catalysts based on neutral nickel complexes of bidentate ligands containing a nitrogen donor atom and an oxygen donor atom (e.g. imine/carboxylate ligands). In addition, this invention provides a process for the preparation of polyolefins.

BACKGROUND OF THE INVENTION

Polyolefins such as polyethylene, polypropylene and copolymers of ethylene and propylene are commercially important materials used as thermoplastics and elastomers. Polyolefins are widely used in a variety of applications including but not limited to packaging, molding, automotive rubber parts, and adhesives.

In contrast to the volumes of work describing early metal group 4–6 olefin polymerization catalysts, there have been relatively few reports of group 10 catalysts for the polymerization of olefins. WO Patent Application 96/23010 describes the polymerization of olefins using cationic nickel, palladium, iron, and cobalt complexes containing diimine and bisoxazoline ligands. WO Patent Application 96/23010 also describes a series of novel polyolefins based on ethylene homopolymer and copolymers, as well as, homo- and copolymers of alpha-olefins including propylene, 1-hexene, and methylacrylate, among others.

European Patent Application Serial No. 381,495 describes the polymerization of olefins using palladium and nickel catalysts which contain selected bidentate phosphorous containing ligands.

Cationic α-diimine-based nickel and palladium complexes have been described by Brookhart and coworkers as highly efficient olefin and α-olefin polymerization catalysts (Johnson, L. K.; Killian, C. M.; Brookhart, M. *J. Am. Chem. Soc.* 1995, 117, 6414). These catalysts polymerize ethylene to high molecular weight branched polyethylene. In addition to ethylene, these complexes act as catalysts for the polymerization and copolymerization of α-olefins (e.g. propylene, 1-hexene, methyl acrylate).

Schmidt and coworkers have also described a cobalt(III) cyclopentadienyl system of the general structure [C₅Me₅(L)CoCH₂CH₂—μ—H]⁺ (Schmidt, G. F.; Brookhart, M. *J. Am. Chem. Soc.* 1985, 107,1443). These catalysts effect the "living" polymerization of ethylene. The living nature of these catalysts has been exploited for the synthesis of end-functionalized polyethylene homopolymers (Brookhart, M.; DeSimone, J. M.; Grant, B. E.; Tanner, M. J. *Macromolecules* 1995, 28, 5378). U. Klabunde, U.S. Pat. Nos. 4,906,754; 4,716,205; 5,030,606; 5,175,326 describe the conversion of ethylene to polyethylene using anionic phosphorous, oxygen donors ligated to Ni(II). The polymerization reactions were conducted between 25 and 100° C. with modest yields, producing linear polyethylene having a weight-average molecular weight ranging between 8K and 350 K.

Peukert and Keim reported the oligomerization of ethylene using a phosphine carboxylate chelate ligand, which showed modest activity (0.14 to 1.83 TO/s). The oligomerizations were carried out at 60 to 95° C. and 10 to 80 bar ethylene in toluene, to produce linear α-olefins (Peuckert, M.; Keim, W. *Organomet.* 1983, 2(5), 594).

In addition, Murray has described the oligomerization of ethylene using phosphine sulphonate chelate ligands. These complexes show catalyst activities about 15 times greater than the activities reported for the phosphine carboxylate analogs described above (R. E. Murray U.S. Pat. Nos. 4,689,437 and 4,716,138,1987).

The polymerization of ethylene and the oligomerization of α-olefins with [aminobis(imino)phosphorane]nickel catalysts has also been described (Keim, W.; Appel, R.; Storeck, A.; Kruger, C.; Goddard, R. *Angew. Chem. Int. Ed. Eng.* 1981, 20,116. Mohring, V. M.; Fink, G. *Angew. Chem. Int. Ed. Eng.* 1985, 24,1001). Other group 10 catalysts known in the art include a nickel allyl phosphine complex described by Wilke (Wilke, G. *Angew. Chem. Int. Ed. Engl.* 1988, 27,185), and a series of Bis(ylide) nickel complexes which are reported by K. Alexander Ostoja Starzewski to polymerize ethylene to high molecular weight linear polyethylene (Starzewski, K. A. O.; Witte, J. *Angew. Chem. Int. Ed. Engl.* 1987, 26, 63).

WO Patent Application 97/02298 discloses the polymerization of olefins using a variety of neutral N, O, P, or S donor ligands, in combination with a nickel(0) compound and an acid.

Fink et al., U.S. Pat. No. 4,724,273, describes the polymerization of α-olefins using aminobis(imino)phosphorane nickel catalysts and the compositions of the resulting poly(α-olefins).

Additional recent developments are described by Sugimura et al., in JP96-84344, JP96-84343 and WO 9738024, and by Yorisue et al., in JP96-70332.

SUMMARY OF THE INVENTION

The present invention provides novel olefin polymerization catalysts based on neutral nickel complexes of bidentate ligands containing a nitrogen atom and an oxygen atom and batch or continuous processes for the preparation of polyolefins using such catalysts. Preferred ligands possess imine and carboxylate groups. Especially preferred catalysts include the following:

a compound of the formula II complexed with a suitable nickel compound.

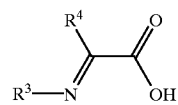

II wherein, R³ is 2,4,6-tri-tert-butylphenyl; and
R⁴ is hydrogen;
a compound of the formula III wherein, $R^3$ is 2,4,6-tri-tert-butylphenyl;

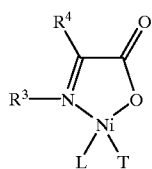

III $R^4$ is hydrogen;
T is hydrogen, hydrocarbyl, or substituted hydrocarbyl; and
L is a mono-olefin or neutral Lewis base where the donating atom is nitrogen, oxygen or sulfur; and
compound of the formula IV

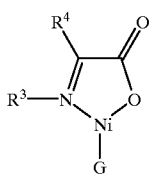

IV wherein, $R^3$ is 2,4,6-tri-tert-butylphenyl;
$R^4$ is hydrogen; and
G is a π-allyl or π-benzyl group.

DETAILED DESCRIPTION OF THE INVENTION

This invention provides a batch or continuous process for the polymerization of olefins comprising contacting, at a temperature from about −100° C. to 200° C. one or more monomers of the formula $R^1CH=CHR^2$ with, (i) a suitable nickel compound, (ii) a compound of the formula I, and, optionally (iii) a neutral Lewis acid;

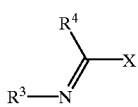

I wherein $R^1$ and $R^2$ are independently hydrogen or hydrocarbyl; in addition, $R^1$ and $R^2$ may collectively be linked to form a non-aromatic cyclic olefin;
$R^3$ is hydrocarbyl, substituted hydrocarbyl, or silyl;
$R^4$ is hydrogen, hydrocarbyl, substituted hydrocarbyl, heteroatom connected hydrocarbyl, or silyl; and
X is selected from the group consisting of:

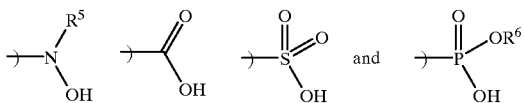

wherein $R^5$ is hydrogen, hydrocarbyl or substituted hydrocarbyl; and
$R^6$ is hydrocarbyl or substituted hydrocarbyl.

As a further aspect of the present invention, there is provided a batch or continuous process for the preparation of polyolefins comprising contacting, at a temperature from about −100° C. to 200° C., one or more monomers of the formula $R^1CH=CHR^2$ with, (i) a compound of the formula II, (ii) a suitable nickel compound, and optionally, (iii) a neutral Lewis acid;

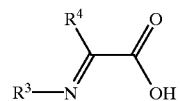

II wherein $R_1$ and $R^2$ are independently hydrogen or hydrocarbyl; in addition, $R^1$ and $R^2$ may collectively be linked to form a non-aromatic cyclic olefin;
$R^3$ is hydrocarbyl, substituted hydrocarbyl, or silyl;
$R^4$ is hydrogen, hydrocarbyl, substituted hydrocarbyl, heteroatom connected hydrocarbyl, or silyl.

As a further aspect of the invention, there is provided a batch or continuous process for the polymerization of olefins comprising contacting, at a temperature from about −100° C. to 200° C., one or more monomers of the formula $R^1CH=CHR^2$ with (i) a transition metal catalyst of the formula III, and optionally (ii) a neutral Lewis acid;

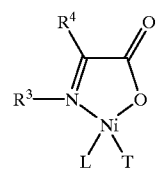

III wherein, $R^1$ and $R^2$ are independently hydrogen or hydrocarbyl; in addition, $R^1$ and $R^2$ may collectively be linked to form a non-aromatic cyclic olefin;
$R^3$ is hydrocarbyl, substituted hydrocarbyl, or silyl;
$R^4$ is hydrogen, hydrocarbyl, substituted hydrocarbyl, heteroatom connected hydrocarbyl, or silyl;
T is hydrogen, hydrocarbyl, or substituted hydrocarbyl; and,
L is a mono-olefin or neutral Lewis base where the donating atom is nitrogen, oxygen or sulfur.

Further, this invention also provides a batch or continuous process for the polymerization of olefins comprising contacting one or more monomers of the formula $R^1CH=CHR^2$ with, (i) a transition metal catalyst of the formula IV, and, optionally (ii) a neutral Lewis acid;

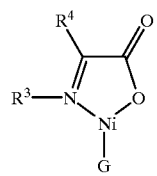

IV wherein, $R^1$ and $R^2$ are independently hydrogen or hydrocarbyl; in addition, $R^1$ and $R^2$ may collectively form a non-aromatic cyclic olefin;
$R^3$ is hydrocarbyl, substituted hydrocarbyl, or silyl;
$R^4$ is hydrogen, hydrocarbyl, substituted hydrocarbyl, heteroatom connected hydrocarbyl, or silyl; and,
G is a π-allyl or a π-benzyl group.

The catalysts described in the present invention readily convert ethylene into branched polyethylene under a variety of conditions including solution polymerizations at ambient temperature and pressure.

In this disclosure certain chemical groups or compounds are described by certain terms and symbols. These terms are defined as follows:

Symbols ordinarily used to denote elements in the Periodic Table take their ordinary meaning, unless otherwise specified. Thus, N, O, S, P, Si and H stand for nitrogen, oxygen, sulfur, phosphorus, silicon and hydrogen, respectively.

Examples of a neutral Lewis base include, but are not limited to, ethers, organic nitrites or organic sulfides.

Examples of neutral Lewis acids include, but are not limited to, $B(C_6F_5)_3$ and $Al(CH_3)_3$.

A "hydrocarbyl" group means a monovalent or divalent, linear, branched or cyclic (bridging) group which contains only carbon and hydrogen atoms. Examples of non-bridging hydrocarbyls include the following: $C_1$–$C_{20}$ alkyl; $C_1$–$C_{20}$ alkyl substituted with one or more groups selected from $C_1$–$C_{20}$ alkyl, $C_3$–$C_8$ cycloalkyl or aryl; $C_3$–$C_8$ cycloalkyl; $C_3$–$C_8$ cycloalkyl substituted with one or more groups selected from $C_1$–$C_{20}$ alkyl, $C_3$–$C_8$ cycloalkyl or aryl; $C_6$–$C_{14}$ aryl; and $C_6$–$C_{14}$ aryl substituted with one or more groups selected from $C_1$–$C_{20}$ alkyl, $C_3$–$C_8$ cycloalkyl or aryl. As used herein, the term "aryl" preferably denotes a phenyl, napthyl, or anthracenyl group. When the above groups are substituted, they are preferably substituted from one to four times with the listed groups. Preferred examples of bridging hydrocarbyls include: —$CH_2$—, —$CH_2CH_2$—, and —$CH_2CH_2CH_2$—.

A "silyl" group refers to an —$SiR_3$ group where R is hydrocarbyl or substituted hydrocarbyl or silyl, as in $Si(SiR_3)_3$.

A "heteroatom" refers to an atom other than carbon or hydrogen. Preferred heteroatoms include oxygen, nitrogen, phosphorus, sulfur, selenium, arsenic, chlorine, bromine, and fluorine.

A "substituted hydrocarbyl" refers to a monovalent or divalent hydrocarbyl substituted with one or more heteroatoms. Examples of monovalent substituted hydrocarbyl include: 2,6-dimethyl-4-methoxyphenyl, 2,6-diisopropyl-4-methoxyphenyl, 4-cyano-2,6-dimethylphenyl, 2,6-dimethyl-4-nitrophenyl, 2,6-difluorophenyl, 2,6-dibromophenyl, 2,6-dichlorophenyl, 4-methoxycarbonyl-2,6-dimethylphenyl, 2-tert-butyl 6-chtorophenyl, 2,6-dimethyl-4-phenylsulfonylphenyl, 2,6-dimethyl-4-trifluoromethylphenyl, 2,6-dimethyl-4-trimethylammoniumphenyl (associated with a weakly coordinating anion), 2,6-dimethyl-4-hydroxyphenyl, 9-hydroxyanthr-10-yl, 2-chloronapth-1-yl, 4-methoxyphenyl, 4-nitrophenyl, 9-nitroanthr-10-yl. Examples of divalent substituted hydrocarbyl include: 4-methoxy-1,2-phenylene, 1-methoxymethyl-1,2-ethanediyl, 1,2-bis(benzyloxymethyl)-1,2-ethanediyl, or 1-(4-methoxyphenyl)-1,2-ethanediyl.

A "heteroatom connected hydrocarbyl" refers to hydrocarbyl and substituted hydrocarbyl groups bound via an oxygen, nitrogen, sulfur, silicon or phosphorus atom; wherein the terms hydrocarbyl and substituted hydrocarbyl are defined as above.

A "heteroatom connected silyi" refers to a silyl group bound via an oxygen, nitrogen, or sulfur atom; wherein the term silyl is defined as above. A "suitable nickel compound" refers to a nickel compound which may be combined with compound I (preferably compound II) to form an active olefin polymerization catalyst. Examples include: bis(1,5-cyclooctadiene)nickel(0) and bis(allyl)nickel(II).

As used herein, the term "monomer" refers to the olefin before it has been polymerized; the term "monomer unit" refers to the moieties of a polymer that correspond to the monomers after they have been polymerized.

The term "π-allyl group" denotes a monoanionic group with three sp² carbon atoms bound to a metal center in a θ-fashion. Any of the three sp² carbon atoms may be substituted with a hydrocarbyl group, or substituted hydrocarbyl group. Examples of θ-allyl groups include:

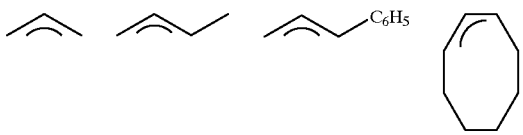

The term "θ-benzyl group" denotes an θ-allyl group where two of the sp² carbon atoms are part of an aromatic ring. Examples of θ-benzyl groups include:

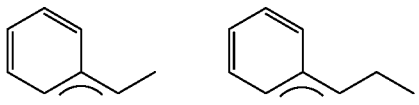

A "mono-olefin" refers to a hydrocarbon containing one carbon—carbon double bond.

The term "polymer" as used herein is meant a species comprised of monomer units and having a degree of polymerization (DP) of ten or higher.

Compounds of formula II are known and can be prepared by methodology known per se in the art. Among other methods known to the skilled artisan compounds of formula III can be prepared by combining II with tetramethylethylenediamine (TMEDA) $Ni(CH_3)_2$ in the presence of acetonitrile.

Compounds of formula IV can be prepared by combing bis(1,5-cyclooctadiene)nickel or bis($\theta^3$-allyl)nickel with compound II in the presence of an inert solvent.

In the processes of the present invention, preferred olefins, i.e., compounds of the formula $R^1CH=CHR^2$, include ethylene and αolefins such as propylene, 1-butene, 1-hexene, 1-octene, and cyclic olefins such as cyclopentene. More preferred olefins include ethylene. The pressure at which the ethylene polymerizations may take place is from 1 atm to 1000 atm, preferably from 1 to 100 atm. Suitable reaction temperatures are preferably from about −100° C. to about 200° C., more preferably in the 20° C. to 150° C. range.

After the reaction has proceeded for a time sufficient to produce the desired polymer, the polymer can be recovered from the reaction mixture by routine methods of isolation and purification.

High molecular weight resins are readily processed using conventional extrusion, injection molding, compression molding, and vacuum forming techniques well known in the art. Useful articles made from them include films, fibers, bottles and other containers, sheeting, molded objects and the like.

Low molecular weight resins are useful, for example, as synthetic waxes and they may be used in various wax coatings or in emulsion form. They are also particularly useful in blends with ethylene/vinyl acetate or ethylene/methyl acrylate-type copolymers in paper coating or in adhesive applications.

EXAMPLES

Other features of the invention will become apparent in the course of the following descriptions of exemplary embodiments which are given for illustration of the invention and are not intended to be limiting thereof.

Example 1
Synthesis of imine/carboxylate ligand HO$_2$CCH=NAr (Ar= 2,4,6-tri-tert-butylphenyl)

A solution of glyoxylic acid monohydrate (0.808 g, 8.8 mmol) in ethanol (19 mL) was treated at room temperature (about 23° C.) with 2,4,6-tri-tert-butylaniline (2.30 g, 8.8 mmol) in one portion. The resulting solution was stirred at reflux for 24 hours. The solution was cooled to room temperature, and the solvent was removed in vacuo. The resulting solid was crystallized from hexanes to afford the imine/carboxylate as a yellow solid (1.32 g, 47.3%): $^1$H NMR (300 MHz, CDCl$_3$) δ 7.63 (s, 1H), 7.36 (s, 2H), 1.33 (s, 9H), 1.29 (s, 18H); FDMS m/z 318 (M+H, 100%).

Example 2
Branched Polyethylene

A 300 mL polymerization Schlenk flask was flame dried and charged with 21 mg of Ni(COD)$_2$ (7.5×10$^{-5}$ mol) and 24 mg of the imine carboxylate (7.5×10$^{-5}$ mol) prepared in Example 1. The flask was filled with ethylene and 50 mL of dry toluene was added. The mixture was stirred for 30 minutes at 23° C., 30 minutes at 60° C., and then several hours at 23° C. Methanol was added, resulting in the complete precipitation of polyethylene. $^1$H NMR is consistent with branched polyethylene. Two melt transitions were observed in the DSC at 66° C. and 104° C., consistent with branched polyethylene.

We claim:

1. A batch or continuous process for the preparation of polyolefins comprising contacting, at a temperature from about −100° C. to 200° C., one or more monomers of the formula R$^1$CH=CHR$^2$ with, (i) a compound of the formula I, (ii) a suitable nickel compound, and optionally, (iii) a neutral Lewis

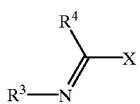

I wherein R$^1$ and R$^2$ are independently hydrogen or hydrocarbyl; in addition, R$^1$ and R$^2$ may collectively be linked to form a non-aromatic cyclic olefin;
R$^3$ is hydrocarbyl, substituted hydrocarbyl, or silyl;
R$^4$ is hydrogen, hydrocarbyl, substituted hydrocarbyl, heteroatom connected hydrocarbyl, or silyl; and
X is selected from the group consisting of

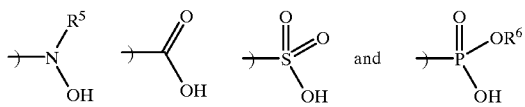

wherein R$^5$ is hydrogen, hydrocarbyl or substituted hydrocarbyl; and
R$^6$ is hydrocarbyl or substituted hydrocarbyl.

2. The process of claim 1 where the suitable nickel compound is bis(1,5-cyclooctadiene)nickel(0).

3. The process of claim 1 where the nickel compound is bis(allyl)nickel(II).

4. The process of claim 1 where the monomer is ethylene.

5. The process of claim 2 where the monomer is ethylene.

6. The process of claim 2 where R$^3$ is 2,4,6-tri-tert-butylphenyl.

7. The process of claim 2 where R$^4$ is hydrogen.

8. The process of claim 2, wherein the polymerization is conducted in an inert solvent.

9. The process of claim 8, wherein the inert solvent is selected from linear or branched hydrocarbons, toluene, or mixtures thereof.

10. The process of claim 2 where the temperature is between about 25° C. and about 150° C., and the pressure is between about 1 atm and about 1000 atm.

11. A batch or continuous process for the preparation of polyolefins comprising contacting one or more monomers of the formula R$^1$CH=CHR$^2$ with, (i) a compound of the formula II, (ii) a suitable nickel compound, and optionally, (iii) a neutral Lewis acid;

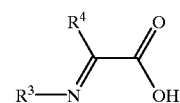

II wherein R$^1$ and R$^2$ are independently hydrogen or hydrocarbyl; in addition, R$^1$ and R$^2$ may collectively be linked to form a non-aromatic cyclic olefin;
R$^3$ is hydrocarbyl, substituted hydrocarbyl, or silyl; and,
R$^4$ is hydrogen, hydrocarbyl, substituted hydrocarbyl, heteroatom connected hydrocarbyl, or silyl.

12. The process of claim 11 where the suitable nickel compound is bis(1,5-cyclooctadiene)nickel(0).

13. The process of claim 11 where the suitable nickel compound is bis(allyl)nickel(II).

14. The process of claim 11 where the monomer is ethylene.

15. The process of claim 12 where the monomer is ethylene.

16. The process of claim 12 where R$^3$ is 2,4,6-tri-tert-butylphenyl.

17. The process of claim 12 where R$^4$ is hydrogen.

18. The process of claim 12, wherein the polymerization is conducted in an inert solvent.

19. The process of claim 18, wherein the inert solvent is selected from linear or branched hydrocarbons, toluene, or mixtures thereof.

20. The process of claim 12 where the temperature is between about 25° C. and about 150° C., and the pressure is between about 1 atm and about 1000 atm.

21. A batch or continuous process for the preparation of polyolefins comprising contacting, at a temperature from about −100° C. to 200° C., one or more monomers of the formula R$^1$CH=CHR$^2$ with, (i) a transition metal complex of the formula II, and optionally, (ii) a neutral Lewis acid;

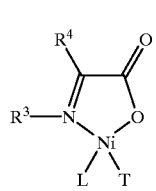

III wherein, R$^1$ and R$^2$ are independently hydrogen or hydrocarbyl; in addition, R$^1$ and R$^2$ may collectively be linked to form a non-aromatic cyclic olefin;

R³ is hydrocarbyl, substituted hydrocarbyl, or silyl;

R⁴ is hydrogen, hydrocarbyl, substituted hydrocarbyl, heteroatom connected hydrocarbyl, or silyl;

T is hydrogen, hydrocarbyl, or substituted hydrocarbyl; and,

L is a mono-olefin or neutral Lewis base where the donating atom is nitrogen, oxygen or sulfur.

22. The process of claim 21 where the monomer is ethylene.

23. The process of claim 21 where R³ is 2,4,6-tri-tert-butylphenyl.

24. The process of claim 21 where R⁴ is hydrogen.

25. The process of claim 21, wherein the polymerization is conducted in an inert solvent.

26. The process of claim 21, wherein the inert solvent is selected from linear or branched hydrocarbons, toluene, or mixtures thereof.

27. The process of claim 21 where the temperature is between about 25° C. and about 150° C., and the pressure is between about 1 atm and about 1000 atm.

28. A batch or continuous process for the preparation of polyolefins comprising contacting, at a temperature from about −100° C. to 200° C., one or more monomers of the formula R¹CH=CHR² with, (i) a transition metal catalyst of the formula IV, and optionally, (ii) a neutral Lewis acid;

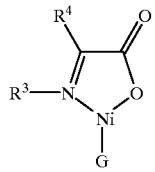

IV wherein, R¹ and R² are independently hydrogen or hydrocarbyl; in addition, R¹ and R² may collectively be linked to form a non-aromatic cyclic olefin;

R³ is hydrocarbyl, substituted hydrocarbyl, or silyl;

R⁴ is hydrogen, hydrocarbyl, substituted hydrocarbyl, heteroatom connected hydrocarbyl, or silyl; and, G is a π-allyl or a π-benzyl group.

29. The process of claim 28 where the monomer is ethylene.

30. The process of claim 28 where R³ is 2,4,6-tri-tert-butylphenyl.

31. The process of claim 28 where R⁴ is hydrogen.

32. The process of claim 28, wherein the polymerization is conducted in an inert solvent.

33. The process of claim 32, wherein the inert solvent is selected from linear or branched hydrocarbons, toluene, or mixtures thereof.

34. The process of claim 28 where the temperature is between about 25° C. and about 150° C., and the pressure is between about 1 atm and about 1000 atm.

* * * * *

UNITED STATES PATENT AND TRADEMARK OFFICE
CERTIFICATE OF CORRECTION

PATENT NO : US 6,174,976 B1
DATED : January 16, 2001
INVENTOR(S) : Christopher Moore Killian et al.

It is certified that error appears in the above-identified patent and that said Letters Patent is hereby corrected as shown below:

Column 7, line 37 (Claim 1, line 6), after "Lewis", ---acid--- should be inserted.

Column 8, line 54 (Claim 21, line 5), "formula II," should read ---formula III---.

Signed and Sealed this

Twenty-ninth Day of May, 2001

NICHOLAS P. GODICI

Attest:

Attesting Officer

Acting Director of the United States Patent and Trademark Office